(12) United States Patent
Gutin (10) Patent No.: US 7,099,086 B2
(45) Date of Patent: *Aug. 29, 2006

(54) WAVELENGTH DIVISION MULTIPLEXING SYSTEM AND METHOD USING RECONFIGURABLE DIFFRACTION GRATING

(75) Inventor: Mikhail A. Gutin, Albany, NY (US)

(73) Assignee: InterScience, Inc., Troy, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/257,198

(22) PCT Filed: Dec. 5, 2000

(86) PCT No.: PCT/US00/42560

§ 371 (c)(1),
(2), (4) Date: Jun. 4, 2003

(87) PCT Pub. No.: WO01/42825

PCT Pub. Date: Jun. 14, 2001

(65) Prior Publication Data
US 2004/0012856 A1    Jan. 22, 2004

Related U.S. Application Data

(63) Continuation of application No. 09/455,093, filed on Dec. 6, 1999, now Pat. No. 6,421,179, which is a continuation of application No. 09/069,502, filed on Apr. 29, 1998, now Pat. No. 5,999,319.

(60) Provisional application No. 60/045,483, filed on May 2, 1997.

(51) Int. Cl.
    *G02B 5/18* (2006.01)

(52) U.S. Cl. ............... 359/573; 359/572; 359/569; 385/37; 398/84; 398/87

(58) Field of Classification Search ............ 359/573, 359/566, 558, 572, 569, 575, 196, 197, 212, 359/223, 224, 855; 398/79, 84, 87; 385/18, 385/31, 37, 10
See application file for complete search history.

(56) References Cited

U.S. PATENT DOCUMENTS

| | | | |
|---|---|---|---|
| 4,701,907 A | 10/1987 | Collins | 370/371 |
| 4,740,951 A | 4/1988 | Lizet et al. | 398/87 |
| 4,773,063 A | 9/1988 | Hunsperger et al. | 398/87 |
| 4,797,589 A | 1/1989 | Collins | 398/46 |
| 4,852,079 A * | 7/1989 | Kinney et al. | 356/305 |
| 5,165,104 A | 11/1992 | Weverka | 385/7 |
| 5,245,681 A | 9/1993 | Guignard et al. | 385/16 |

(Continued)

FOREIGN PATENT DOCUMENTS

JP      04352108 A    * 12/1992

OTHER PUBLICATIONS

B. Mikkelsen, et al., Wavelength Conversion Devices, OFC '96 Technical Digest, 1996, pp. 121-122.

(Continued)

*Primary Examiner*—Arnel C. Lavarias
(74) *Attorney, Agent, or Firm*—Jay R. Yablon; Michelle D. Simkulet (57) ABSTRACT

An improvement in a wavelength division multiplexer and/or a dense wavelength division multiplexer (WDM/DWDM) is achieved by incorporating an electronically reconfigurable diffraction grating (108). The introduction of the electronically reconfigurable diffraction grating (108), which is typically fabricated using MEMS (microelectromechanical systems) technology, improves the compact design, durability, and dynamic functionality of the WDM/DWDM system.

24 Claims, 6 Drawing Sheets

U.S. PATENT DOCUMENTS

| | | | |
|---|---|---|---|
| 5,311,360 A | 5/1994 | Bloom et al. | 359/572 |
| 5,446,809 A | 8/1995 | Fritz et al. | 385/17 |
| 5,504,575 A | 4/1996 | Stafford | 356/330 |
| 5,581,642 A | 12/1996 | Deacon et al. | 385/15 |
| 5,650,835 A | 7/1997 | Matic | 349/201 |
| 5,712,932 A | 1/1998 | Alexander et al. | 385/24 |
| 5,757,536 A | 5/1998 | Ricco et al. | 359/224 |
| 5,771,112 A | 6/1998 | Hamel et al. | 398/83 |
| 5,841,579 A | 11/1998 | Bloom et al. | 359/572 |
| 5,905,571 A * | 5/1999 | Butler et al. | 356/328 |
| 5,915,051 A | 6/1999 | Damask et al. | 385/16 |
| 5,917,625 A | 6/1999 | Ogusu et al. | 385/24 |
| 6,421,179 B1 | 7/2002 | Gutin et al. | 359/572 |
| 6,479,811 B1 * | 11/2002 | Kruschwitz et al. | 250/237 G |

OTHER PUBLICATIONS

G-K. Chang, et al., Multiwavelength Reconfigurable WDM/ATM/SONET Network Testbed, Journal of Lightwave Technology, vol. 14, No. 6, Jun. 1996, pp. 1320-1340.

C. Wenlu, et al., Re-configurable All Optical Add/Drop Multiplexer with Dynamic Gain Control Function, SPIE vol. 3552, 1998, pp. 98-102.

J. Castracane & M. Gutin, MEMS-based microgratings: preliminary results of novel configurations, SPIE vol. 3276, Mar. 1998, pp. 196-206.

* cited by examiner

WAVELENGTH DIVISION MULTIPLEXING SYSTEM AND METHOD USING RECONFIGURABLE DIFFRACTION GRATING

CROSS REFERENCE TO RELATED APPLICATIONS

This application is a continuation of application U.S. Ser. No. 09/455,093 filed Dec. 6, 1999, 1999, now U.S. Pat. No. 6,421,179 issued Jul. 16, 2002, and is also a U.S. national stage application (35 USC 371) based on PCT/US00/42560 filed Dec. 5, 2000. Said U.S. Ser. No. 09/455,093 is a continuation-in-part of application Ser. No. 09/069,502, filed Apr. 29, 1998, which in turn claims the benefit of U.S. Provisional Application No. 60/045,483, filed May 2, 1997.

FIELD OF THE INVENTION

This invention relates to the field of wavelength division multiplexing and dense wavelength division multiplexing/demultiplexing, and particularly to the use of reconfigurable diffraction gratings in both fields.

BACKGROUND OF THE INVENTION

Wavelength Division Multiplexing (WDM) and Dense Wavelength Division Multiplexing (DWDM) systems are important components in fiber optic communication systems and networks. The essential component of such systems focus on the multiplexer/demultiplexer. Current alternatives include diffractive elements such as dielectric thin film filters, arrayed waveguide gratings and fiber Bragg gratings, each possessing their own advantages and disadvantages for a particular system design. Overall it is desirable in such a system or network application to minimize crosstalk between channels by maximizing channel isolation. This task becomes increasingly more difficult in all fiber DWDM systems where channel spacing and bandwidth is very small. (Pan, Shi, and Loh, WDM Solutions, Laser Focus World Supplement, September 1999, pp. 15–18.) Prior art technology is primarily comprised of devices and systems utilizing the aforementioned diffractive elements, and attention is often given to improving resolution of the system while minimizing crosstalk by improving other system components such as the fiber optic channels.

Reconfigurable multiplexing devices can be achieved in a variety of ways. Several such prior art devices have different levels of reconfigurability, functionality and performance. For example, U.S. Pat. No. 5,245,681 discloses a reconfigurable wavelength multiplexing device that relies on a fiber optic tree structured switching matrix to provide the reconfigurability of the system. The switching matrix is comprised of several stages of optical couplers that are controlled by the application of a specified voltage. The voltage application is used to control the passage of light through the coupler. The ability to turn on and off the voltages to the individual couplers in the matrix make the device reconfigurable.

U.S. Pat. No. 5,550,818 utilizes an optical fiber network ring in a wavelength division multiplexing system. Cross-connecting switching devices control the signal routing through the system. Again, the switches are based on voltage application to the switch.

U.S. Pat. No. 5,650,835 discloses a reconfigurable optical beamsplitter in which periods of optical phase shift regions are established across a liquid crystal cell to form an optical grating in the liquid crystal that will perform as a multiplexing or demultiplexing device. The desired pattern of phase shift regions across the cell is accomplished by applying corresponding voltage differentials across the cell which can be dynamically reconfigured.

U.S. Pat. No. 5,771,112 provides a reconfigurable device for the insertion and the extraction of wavelengths utilizing a main optical switch connected to a specified number of add/drop multiplexers.

U.S. Pat. No. 5,712,932 provides a dynamically reconfigurable wavelength division multiplexer. The reconfigurable optical routing system is achieved by using fiber-based Bragg grating or a wavelength selecting optical switch in combination with a fiber optic directional coupler.

All of the above-noted prior art relies primarily on some form of an optical switch to allow or disallow signal passage through an established route in the network or system. However, these systems are limited in their ability to redirect a specified wavelength through a different route in the system. An improvement that enables such rerouting would have direct application in and benefits to the communications industry.

A key component in a WDM/DWDM system is the means of separating the incident light by wavelength. Although there are many means to accomplish this, recent advances in micromachining technology have led to the development of reconfigurable diffraction gratings that can be applied to multiplexing. Such micromachined gratings can be used for various electro-optical applications such as multiplexing, spectroscopy, modulated display technology and optical signal processing.

A deformable grating apparatus is presented in U.S. Pat. Nos. 5,459,610 and 5,311,360, both by Bloom et al. An array of beams, at initially equal heights and with reflective surfaces, are supported at predetermined fractions of incident wavelength above a similarly reflective base. Below the base is a means of electrostatically controlling the position of the beams by supplying an attractive force which will deflect all of the beams or every other beam to a secondary position. The diffraction of the incident light is dependent upon the position of the reflective beam elements.

An electronically programmable diffraction grating is presented in U.S. Pat. No. 5,757,536 by Ricco, et al. A plurality of electrodes control a series of grating elements whose upper surface diffract incident light. The grating is typically formed by a micromachining process.

Although reconfigurable in nature, the micromachined diffraction gratings discussed above are still limited in their useable bandwidth and the span of available wavelengths for at least the specified application of lightwave multiplexing and demultiplexing. Ideally, the reconfigurable diffraction grating used should at least permit virtually unlimited, dynamic wavelength selection, which the prior art does not permit.

OBJECTS OF THE INVENTION

Therefore, it is the object of the invention disclosed herein to provide an improved wavelength division multiplexer (WDM) using an electronically reconfigurable diffraction grating.

It is also an object of the invention to provide an improved dense wavelength division multiplexer (DWDM) using an electronically reconfigurable diffraction grating.

It is also an object of the invention to provide an improved WDM/DWDM system using an electronically reconfigurable diffraction grating capable of dynamic reconfigurability of output.

It is also an object of the invention to provide an improved WDM/DWDM system capable of simultaneous demultiplexing and optical switching functions.

It is also an object of the invention to provide an improved WDM/DWDM system capable of demultiplexing input light over an increased optical waveband range.

SUMMARY OF THE INVENTION

The invention disclosed herein in several embodiments provides an improvement in a wavelength division multiplexer and/or a dense wavelength division multiplexer (WDM/DWDM) by incorporating an electronically reconfigurable compound diffraction grating into the overall multiplexing apparatus or system. The introduction of an electronically reconfigurable compound diffraction grating, which is typically fabricated using MEMS (microelectromechanical systems) technology, improves the compact design, durability, and functionality of the WDM/DWDM system.

In particular, the electronically reconfigurable compound diffraction grating improves upon alternative wavelength separation technology such as dielectric filters, arrayed waveguide gratings, and fiber Bragg gratings, which all limit WDM/DWDM systems regarding channel separation and channel. The present invention allows individual channels or wavelengths to be automatically switched between different system detectors. The optical switching functions, and also the multiplexing/demultiplexing functions, are both incorporated in a single device. This adds tremendous flexibility to an optical network. The reconfigurable compound diffraction grating has the necessary resolution to be useful for both WDM and DWDM applications.

In the preferred embodiment, this optical wavelength division multiplexing apparatus comprises a reconfigurable diffraction grating diffracting at least one input light beam into diffracted light beams of N wavebands wherein N is an integer greater than zero; and further diffracting each of these input light beams into diffracted light beams across X diffraction orders wherein X is an integer greater than zero, for each of these N wavebands.

BRIEF DESCRIPTION OF THE DRAWINGS

The features of the invention believed to be novel are set forth in the associated claims. The invention, however, together with further objects and advantages thereof, may best be understood by reference to the following description taken in conjunction with the accompanying drawings in which:

DETAILED DESCRIPTION

The primary basic function of a wavelength division multiplexer or dense wavelength division multiplexer (WDM/DWDM) is to provide a means of wavelength separation to a fiber optic communication system or network. Input light is separated into a plurality of channels with typically narrow width and wavelength separation. Therefore each channel is designated a specific spectral bandwidth that can be detected or monitored. A dense wavelength division multiplexer is a more specific class of wavelength division multiplexer in which the channel width and separation is extremely narrow. The WDM/DWDM can be utilized with a variety of light input sources, typically broadband from a series of narrow band sources, or from a single broadband source, introduced fiber optically to the network. The single most important feature of such a system is the ability to accurately and precisely separate the incoming light on the receiver end of the fiber into the desired number of channels at the specified wavelengths and spectral widths, and also to properly deliver that light energy to the desired detector or sensor. As the light is separated by wavelength, it is important to minimize insertion loss and channel crosstalk.

The present invention provides an improved WDM/DWDM that utilizes a reconfigurable compound diffraction grating. A "compound" diffraction grating is a diffraction grating which effectively combines and interleaves two or more grating structures at different positions in the same physical space, in a way that will become clearer from the disclosure herein. In addition to multiplexing capabilities, the present invention provides for optical switching of the multiple channel outputs between at least two different sets of photodetectors. In this way, it essentially combines the function of a WDM and an optical switch into a single compact device.

Figure 1:
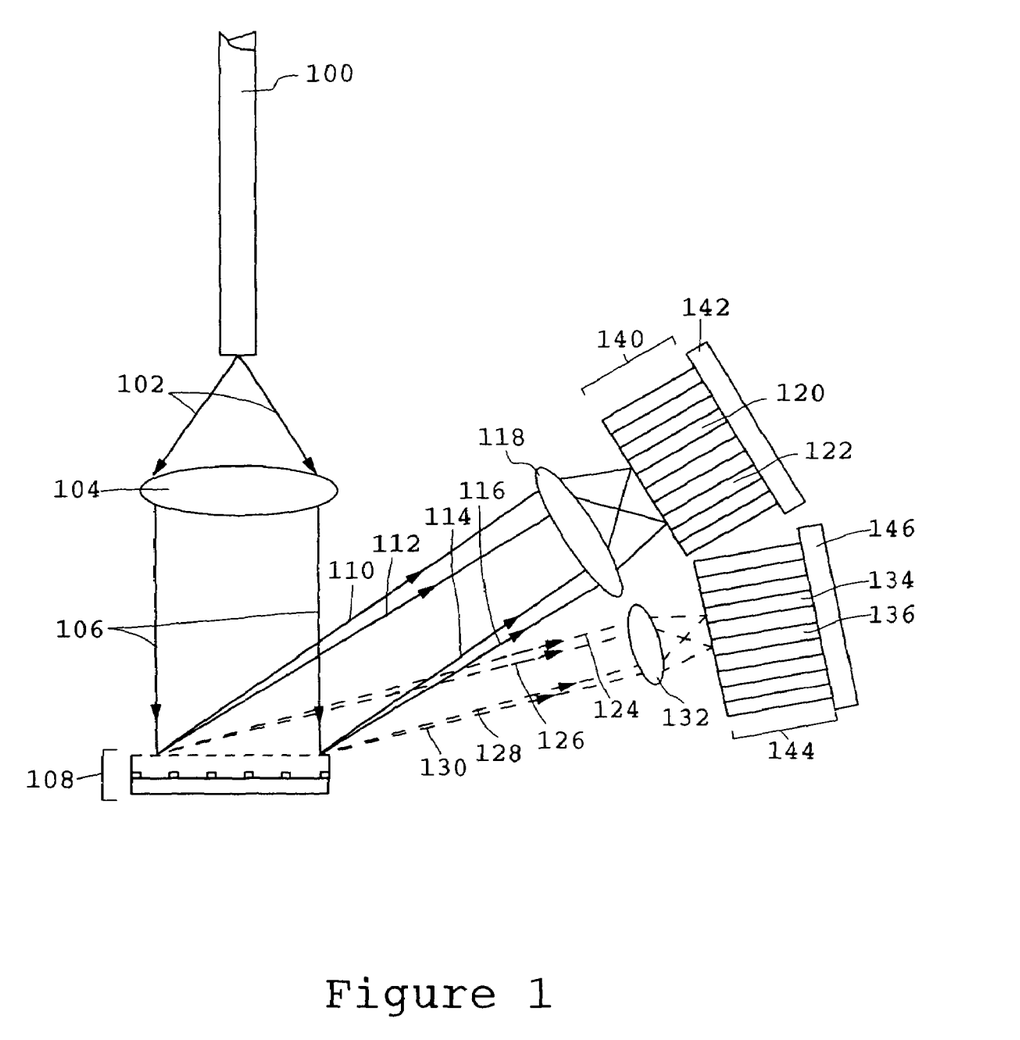
FIG. 1 is a two dimensional cross-sectional schematic view of the wavelength division multiplexer utilizing a reconfigurable diffraction grating to diffract light to the first order and alternatively to the second order.

FIG. 1 is a two dimensional operational schematic of the WDM/DWDM according to the invention. Optical input means such as fiber 100 introduces light source energy into the system. As mentioned above, the input means 100 is capable of providing light, for example, from a series of narrowband sources, or from a single broadband source, to the sensor network. The dispersed input source light 102 is collected by a first system focusing means (e.g., lens) 104 such as the illustrated lens. The first system focusing means 104 is ideally located a focal length away from input means 100 end so as to produce collimated input light 106 comprising at least one input light beam which impinges upon the reconfigurable compound diffraction grating 108. This configuration adds to the efficiency of the system or network by minimizing the number of optical components in the system and maximizing the energy throughput of the system.

Reconfigurable compound diffraction grating 108, it will be observed, is a reflection-type grating where the diffracted output light emerges from the same side of the grating structure that the input light enters, as opposed to a transmission-type grating where light enters one side of the grating structure, is diffracted, and then emerges out the other side.

As stated above and elaborated below, reconfigurable compound diffraction grating 108 not only separates light by wavelength for multiplexing, but enables switching among multiple photodetectors by using various diffractive orders of the diffracted light. The specific operation of a preferred mode for reconfigurable compound diffraction grating 108 will be described in detail below, but other less-preferred, yet still suitable grating structures can also be employed within the scope of this disclosure and its associated claims.

FIG. 1 illustrates reconfigurable compound diffraction grating 108 separating collimated input light 106 into only two wavelengths in only the first order and second order, just to simplify the drawing. It is understood and hereby disclosed, however, that reconfigurable compound diffraction grating 108 can separate the incoming light into N distinctly separate channels. It is also understood and hereby disclosed that reconfigurable compound diffraction grating 108 can diffract the light into a single order or multiple orders ranging from the first order to X higher orders (the zero order is also available as well). These variables N and X are functions of the design of the reconfigurable compound diffraction grating 108, and will be described in detail below.

FIG. 1 thus illustrates a sample, not limiting, situation wherein the diffraction of light is completely directed to the first order as shown in the solid-line trajectory, or optionally to the second order as shown by the dotted-line trajectory. Again, only the first two orders are shown for simplicity, but the invention extends into X higher orders as well. The optical switching between and among the orders, and thus between and among various detectors, of all or part of the input light, is a distinct advantage enabled only by the incorporation of reconfigurable compound diffraction grating 108 into the WDM/DWDM.

As detailed in FIG. 1, a diffracted light beam of a first wavelength of a first input light beam is diffracted to first order 110 by the reconfigurable compound diffraction grating 108. Similarly, a diffracted light beam of second wavelength of the first input light beam is diffracted to first order 112. Further, reconfigurable compound diffraction grating 108 similarly diffracts a diffracted light beam of said first wavelength of a second input light beam to first order 114, and a diffracted light beam of said second diffracted wavelength of the second input light beam to first order 116. Again, for simplicity, only two input beams and associated diffracted beams are shown in FIG. 1. It would be understood by someone of ordinary skill the collimated input light 106 is incident on and diffracted from the entire surface of the reconfigurable compound diffraction grating 108 and thus comprises numerous input light beams.

All of the first order diffracted light beams (110, 112, 114, and 116) are collectively focused by a first order focusing means (e.g. lens) 118, to a first order, first wavelength output means (e.g. fiber) 120 and a first order, second wavelength output means (e.g. fiber) 122. Typically the output means (120 and 122), e.g., fibers, are components of a larger first order set of output means 140 such as a first order output fiber array that is coupled to a first order optical detection means 142. This figure is representative of the operation of the invention, and again, is considered to include N output fibers in the output fiber array/bundle, with each fiber corresponding to and carrying one of the N diffracted wavelengths or wavebands. Each wavelength or waveband is then delivered to one of at least N regions of optical detector 142, each said region receiving and detecting that wavelength.

As stated above, reconfigurable compound diffraction grating 108 can also be configured to wholly or partially diffract light into any of the higher orders so as to specify wavelengths for individual detectors. In FIG. 1, the alternative of diffracting light into the second order is demonstrated by the dotted trajectory. This also can be extended into higher orders, with multiple detectors available to the system, and the separation by order serving to implement an optical switch simultaneously with multiplexing by wavelength or waveband.

Continuing the detailed description of FIG. 1, therefor, the first wavelength of the first light beam is also diffracted to second order 124, as is the second wavelength of the first light beam also diffracted to second order 126. In addition, reconfigurable compound diffraction grating 108 similarly diffracts the first wavelength of the second light beam to second order 128, and the second wavelength f the second light beam to second order 130.

Similarly to what was earlier described for first order, the second order input light beams (124, 126, 128, and 130) are collectively focused by a second order focusing means (e.g., lens) 132 to a second order, first wavelength output means (e.g. fiber) 134 and a second order, second wavelength output means (e.g. fiber) 136. Typically the output fibers (134 and 136) are components of a larger second order set of output means 144 such as a second order output fiber array/bundle, coupled to a second order optical detection means 146.

As stated above, this figure is a simplified representation of the operation of the reconfigurable compound diffraction grating 108 in order to clearly demonstrate the diffraction into wavelengths and orders. It is understood that the reconfigurable compound diffraction grating 108 is capable of diffracting light along the entire length of the grating into any specified order among the X orders, and of separating that light into N wavelengths, as determined by its specific design. This figure is representative of the operation and the invention is thus considered to include N output fibers in the output fiber array/bundle, each fiber corresponding to one the N diffracted wavelengths or wavebands, as well as X optical detection means and X fiber arrays/bundles, one for each of the X orders.

The optical components used in FIG. 1 to provide collimated light input 106 to reconfigurable compound diffraction grating 108 is a simple first system lens 104 placed a focal length away from the input fiber 100. Alternatives to the preferred embodiment include more complex means of collimating optics including multi-element lens systems that provide similar means of collimation in a more complex design where the possibility of optical transmission loss needs to be compensated by a more sophisticated lens system.

The preferred embodiment includes the utilization of output fibers (i.e. 120, 122, 134, 136), typically as part of a fiber optic array or bundle (i.e. 140, 144), to collect the individual wavelengths produced by the overall system. The use of output fibers minimizes space requirements in the multiplexer design and allows easy direction of individual or multiple wavelength output to specific optical detection means (i.e. 142, 146).

In an alternative embodiment, individual optical detectors can be placed directly at the focus of the first or second order lens (118 or 132, respectively) to collect the output directly, and fibers (i.e. 120, 122, 134, 136) and fiber bundles (i.e. 140, 144) omitted from FIG. 1.

Optical detection means (i.e. 142, 146) capture the intensity of the individual channels of the WDM/DWDM system. Typically intensity detectors comprise individual photodiodes, or alternatively detector arrays such as CCD's or CID's. The optical detection means can be either analog or digital, but primarily serves to measure the intensity of the signal produced by the individual channels of the system represented by the individual output fibers.

Before discussing the details of reconfigurable compound diffraction grating 108, it is helpful to clarify the use of the terms "wavelength," "waveband," and "channel" as used herein. In the art, a waveband is often a light signal comprising one or more wavelengths that are fairly close to one another, i.e., comprising one or more wavelengths within a given narrow range of wavelengths defining the waveband. A "channel" is frequently used to describe the carriage of a single such "waveband" comprising one or more "wavelengths."

As used in this disclosure, the term "waveband" is to be broadly interpreted and understood as comprising one or more wavelengths close to one another which are suitable for grouping together in a single waveband and carriage over a single channel such as a single fiber. Thus, each of the N "wavelengths" or "wavebands" diffracted at a given order by the reconfigurable compound diffraction grating specified herein are to be understood and interpreted as comprising one or more wavelengths close to one another, and are not to be understood or interpreted as comprising only a single wavelength. Thus, a diffraction grating which diffracts two or more close but distinct "wavelengths" toward a single one of the N optical fibers and/or N detector regions as disclosed herein, would be considered as diffracting a single waveband toward that single optical fiber or detector region.

In the claims herein, it is to be observed that the term "waveband" is employed throughout, and that this term is to be understood and defined as comprising possibly only one wavelength of light, but alternatively as comprising two or more close but distinct wavelengths of light within a single defined wavelength band.

It is also to be observed that the foregoing discussion and the claims refer to N regions of the detectors 142 and 146. It is to be understood that detectors, such as photodiodes, are typically unitary entities and do not have any distinctly defined regions associated therewith. There are also detectors that comprise an array of distinct elements or pixels, such as CCD's, whereas these elements could be construed as regions of the detector. However, in the present invention, once light has been separated (demultiplexed) into N distinct wavelengths or wavebands as described above, this separated light will be directed toward and ultimately impinge on a detector. As it impinges on the detector, the light itself in effect defines N regions of the detector for the present invention by virtue of its N distinctly separate wavelengths or wavebands impinging on the detector. That is, a given single region of the detector comes into being and is defined by the fact that a given single wavelength or waveband of separated light is directed to and ultimately strikes upon that given single region of the detector, and not by any inherent "regional" property of the detector itself.

And finally, it is to be observed that the terms "multiplexing" and "demultiplexing" are typically used in the literature together, as in referring to a multiplexing/demultiplexing system. In a technical sense, however, multiplexing refers to the combining or splicing together of separate wavelengths or wavebands into a single light signal, while demultiplexing refers to the splitting of a light signal into separate component wavelengths or wavebands. Thus, the system illustrated and described in FIG. 1 is really a demultiplexer in the technical sense of that term. However, given the tendency for these two terms to be used together somewhat interchangeably in the art and in the literature, and the common and accepted use of "multiplexing system" to refer to a system that demultiplexes multiplexed signals, the term "multiplexing system" is what has been selected to refer in categorical terms to the invention disclosed herein.

At this point, we turn to the diffraction grating itself. The primary basic function of a diffraction grating in any application is to separate incident light by wavelength. A diffraction grating in general is sensitive to the wavelength and input angle of incident light, and its primary operation is to diffract specific wavelengths of light at specific angles based on the grating design.

Figure 2:
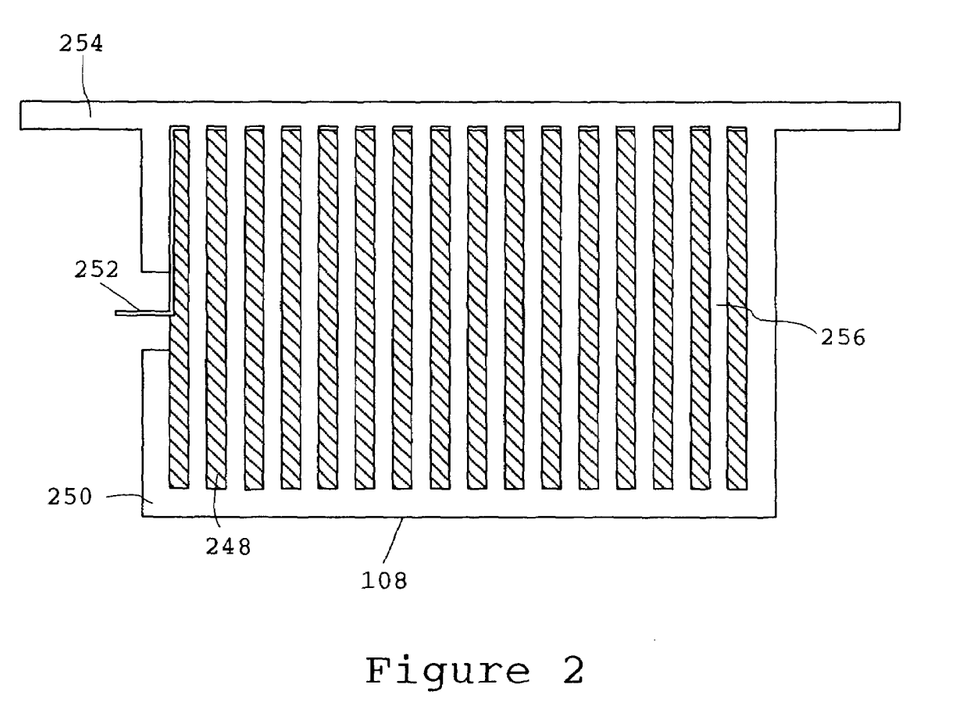
FIG. 2 is a top view of the preferred mode of an electronically reconfigurable diffraction grating for use in accordance with the invention.
Figure 4:
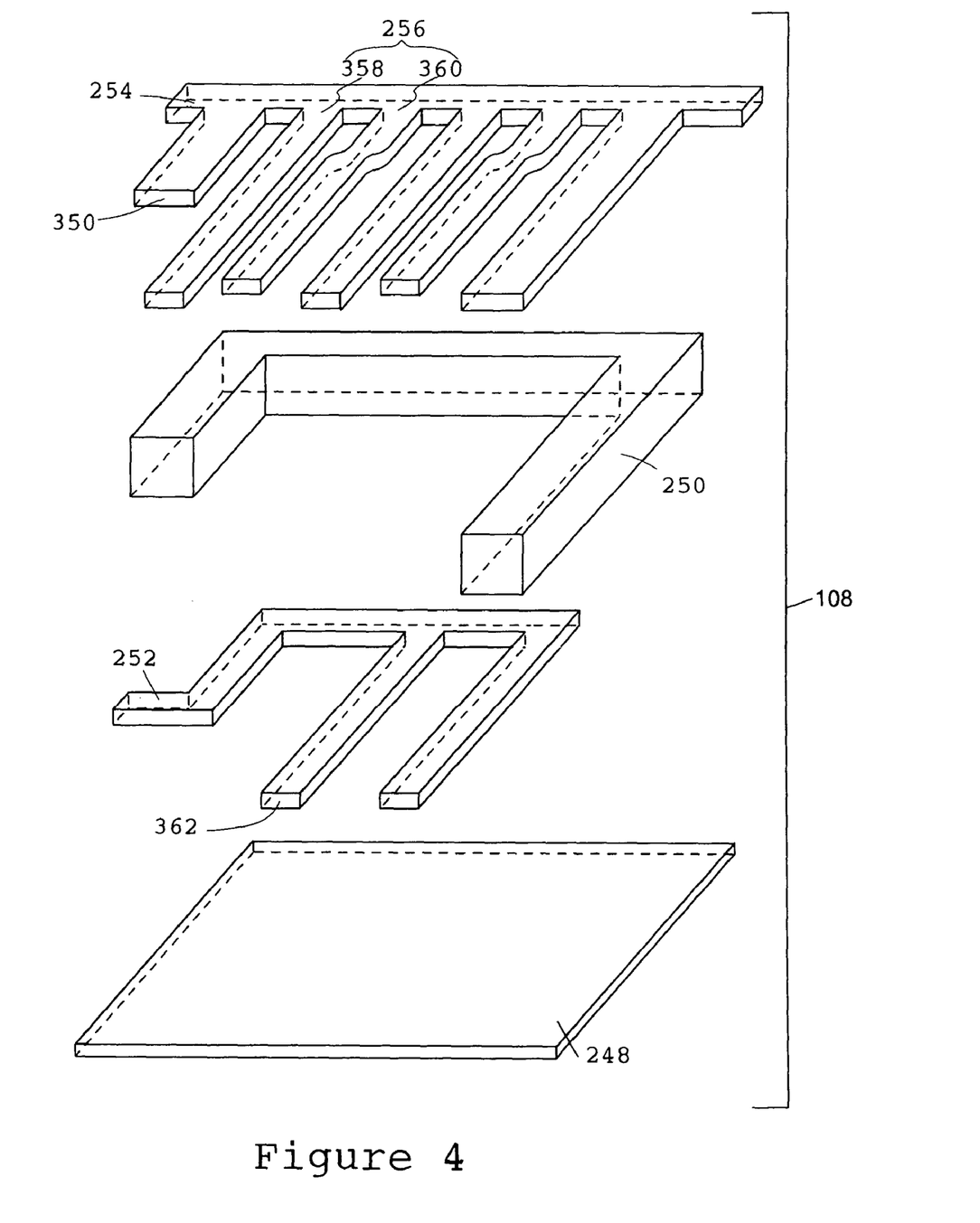
FIG. 4 is an exploded three dimensional view of one embodiment of the preferred mode of the electronically reconfigurable compound diffraction grating, in its initial position.
Figure 5:
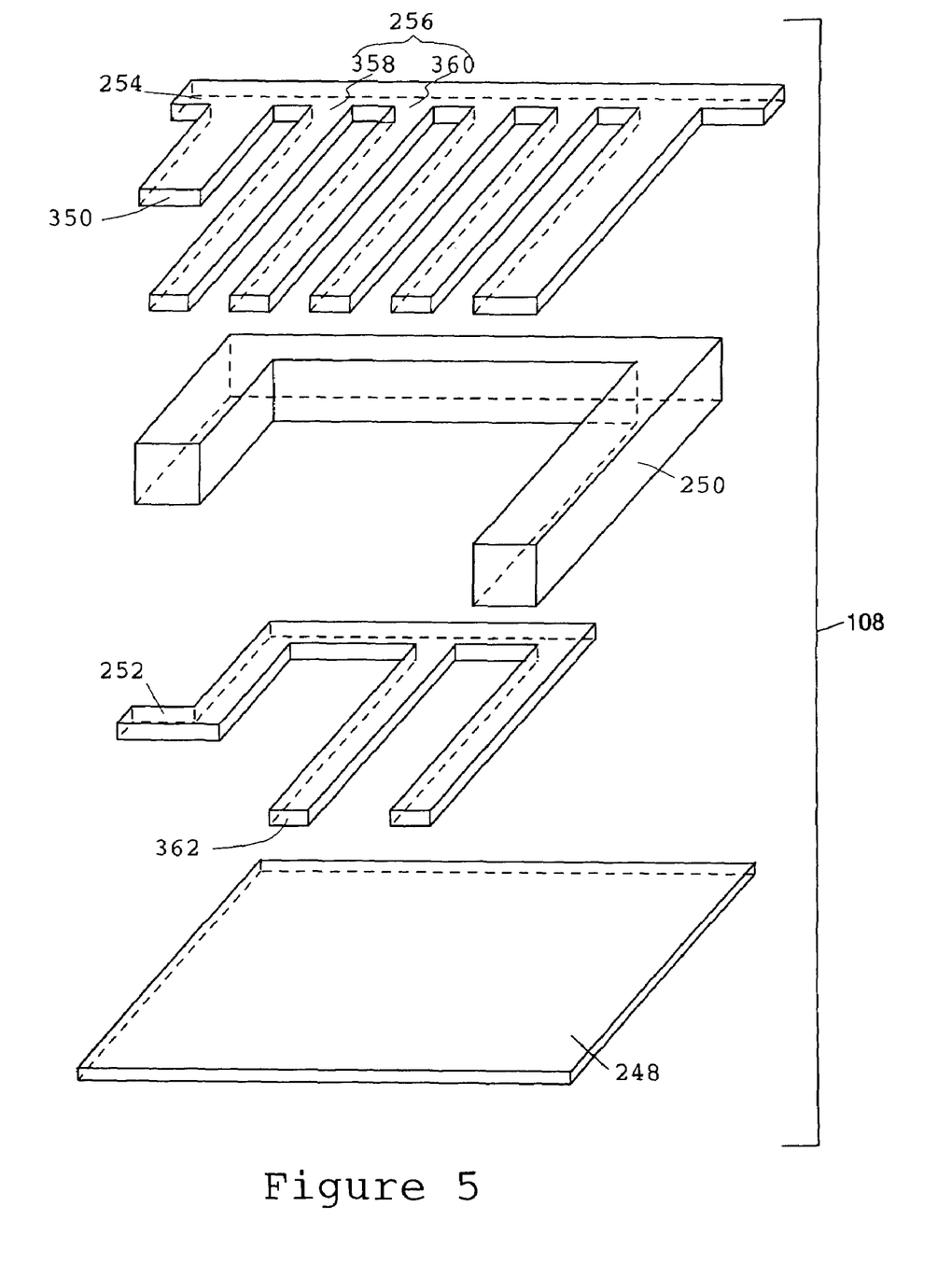
FIG. 5 is an exploded three dimensional view of one embodiment of the preferred mode of the electronically reconfigurable compound diffraction grating, in its energized position.

The preferred mode of reconfigurable compound diffraction grating 108 used in the preferred embodiment of the invention is shown from a top view in FIG. 2 and exploded cutaway isometric views in FIGS. 4 and 5. A base 248, typically made of silicon, supports a frame 250. A lower electrode lead 252 lies on the base 248, and runs parallel to and below the frame 250, as shown in FIG. 4. An upper electrode lead 254, runs through two corners of the frame 250 along the top surface 350 (see FIGS. 4 and 5) of said frame 250, generally perpendicular to the extension of a set of diffraction beams 256 supported at their ends by the frame 250.

In one set of embodiments, this set of diffraction beams 256 comprises both stationary beams 358 and deflectable beams 360, as shown in FIGS. 3 through 8. In another embodiment, shown in FIG. 9, all of the diffraction beams 256 are deflectable beams 360. In all embodiments, diffraction beams 256 run substantially parallel to each other and substantially perpendicular to the sides of the frame 250, by which they are supported. Diffraction beams 256 are of substantially uniform thickness, width and length. Diffraction beams 256 are much longer than they are wide and thick, and are spaced along frame 250 at periodic intervals. Both the base 248, and the top surface of the set of beams 256, are of a reflective nature.

The upper electrode lead 254, the top surface 350 of the frame 250, and the set of beams 256 are all electrically connected, and together comprise an upper electrode. The lower electrode lead 252 and a series of lower electrode extension beams 362 are all electrically connected, and together comprise a lower electrode. The frame 250, which is an electrical insulator, enables the introduction of voltage differentials between the upper electrode comprising 254, 350 and 256, and the lower electrode comprising 252 and 362.

The deflectable beams 360 can be identified as those in the set of beams 256 which have the lower electrode extension beams 362 running underneath them. Also, in their initial undeflected position shown in FIG. 4 (see also FIGS. 6 through 9), the deflectable beams 360 are in an elevated plane above the stationary beams 358, although remaining generally parallel thereto. The relative parallelism is achieved by the excessive length of all of the beams 256 as compared to their length and width. This elevation of the deflectable beams 360, and in particular the reconfigurable, compound nature of this grating, is a key design feature in of reconfigurable compound diffraction grating 108, which can be viewed as the "compound" superposition of two grating structures. The series of deflectable beams 360, comprise a low resolution grating secondary to the higher resolution primary grating consisting of the full set of beams 256.

Figure 7:
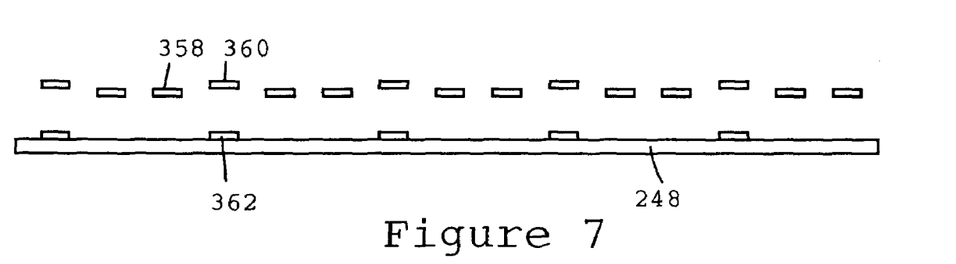
FIG. 7 is a schematic cross sectional view of another embodiment of the preferred mode of the reconfigurable compound diffraction grating wherein every third beam is a deflectable beam with an associated lower electrode extension beam.
Figure 8:
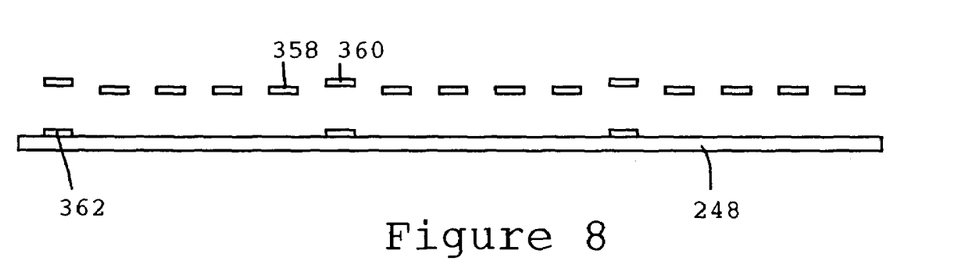
FIG. 8 is a schematic cross sectional view of another embodiment of the preferred mode of the reconfigurable compound diffraction grating wherein every fifth beam is a deflectable beam with an associated lower electrode extension beam.
Figure 9:
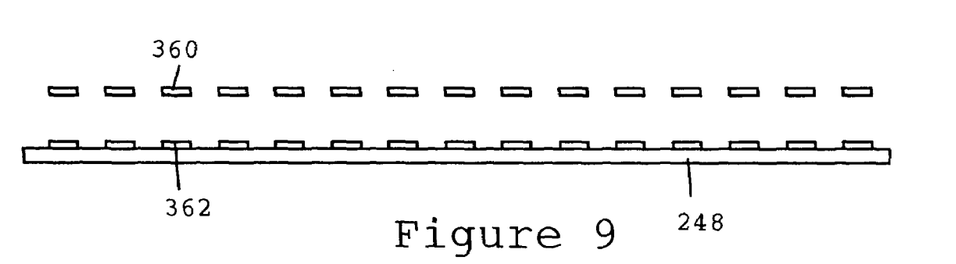
FIG. 9 is a schematic cross-sectional view of another embodiment of the preferred mode of the reconfigurable diffraction grating wherein every beam is a deflectable beam with an associated lower electrode extension beam.

In the embodiment of FIGS. 2 through 8, the "compound" superposition of this grating structure is built in by the prefabrication of elevated deflectable beams 360 having lower electrode extension beams 362 running underneath them, and of stationary beams 358 defining a plane slightly below that of deflectable beams 360 and not having any lower electrode extension beams 362 associated therewith. In the embodiment of FIG. 9, which will be elaborated further below, all of the beams are deflectable beams 360, there are no stationary beams 358, and the "compound" structure wherein one set of beams is elevated with respect to another set of beams is achieved by applying a voltage differential to one set of beams while applying different voltage differentials (or no voltage differentials) to other sets of beams. In all embodiments, the system is reconfigured, at will, by a suitable application of voltage differentials to suitable set of diffraction beams 256. The embodiment of FIG. 9 is the most general, for so long as the voltage differential that can be applied to each diffraction beam 256 is individually controllable, the overall grating structure can be actively reconfigured in any chosen manner whatsoever.

Thus, in FIGS. 2 through 8, the diffraction of incident light by reconfigurable compound diffraction grating 108 is controlled by manipulating the vertical position of particular individual beams in the set of beams 256, and in particular, by changing the vertical position of the deflectable beams 360 while leaving unaltered the vertical position of the stationary beams 358. In FIG. 9, this is achieved by changing the vertical position of one set of beams, while leaving the vertical position of other sets of beams unaltered or differently changed.

Figure 3:
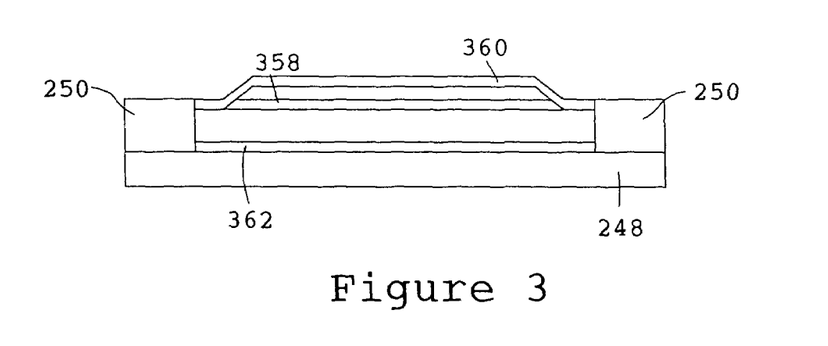
FIG. 3 is a two dimensional side view of a deflectable beam and stationary beam in an initial position of one embodiment of the preferred mode of the reconfigurable compound diffraction grating for use in accordance with the invention.

FIG. 3 shows a cutaway side view of the interior of reconfigurable compound diffraction grating 108 in which the vertical elevation of the plane of the deflectable beams 360, over the plane of the stationary beams 358 is evident. One of the lower electrode extension beams 362 is shown lying on the base 248, immediately beneath one of the deflectable beams 360. This deflectable beam 360 is shown in its initial position. As seen in FIG. 3, the majority of the top surface of the deflected deflectable beam 360, remains substantially parallel to an adjacent stationary beam 358. Application of a voltage differential between the deflectable beams 360, and the lower electrode extension 362, results in a deflection of the beams 360, in which they approach the plane of the stationary beams 358. Of course, application of different voltages would result in different degrees (distances) of deflection.

FIG. 4 is a cutaway isometric view of the reconfigurable compound diffraction grating 108 in an initial, undeflected position. This view shows exactly how the lower electrode extension beams 362 project along the base 248 from the lower electrode lead 252, and how the deflectable beams 360 are positioned directly above the lower electrode extension beams 362 so that they may be deflected when a voltage differential is applied between the upper and lower electrodes generally.

FIG. 5 is a similar cutaway isometric view of the reconfigurable compound diffraction grating 108, with the deflectable beams 360 depicted at a deflected position in which the deflectable beams 360 are in the same plane as the stationary beams. Applying a voltage differential across the two (upper and lower) electrodes via the upper and lower electrode leads 254 and 252, respectively, causes the deflectable beams 360 to move towards the lower electrode extension beams 362. The deflection of the deflectable beam 360, is proportional to the voltage applied to the lower electrode lead 252, and therefore to the lower electrode extension beam 362 electrically connected thereto. The upper electrodes (comprising 254, 350, and 256 (i.e., 358/360)) are typically fabricated as a unit whole with the rest of the grating structure typically of a material such as silicon. No shielding is necessary between the stationary beams, 358, and the adjacent deflectable beams, 360, since the aspect ratio of the set of beams, 256, is such that voltage applied to the lower electrode lead 252, and therefore to the lower electrode extension beam, 362, is enough to only deflect the deflectable beam, 360.

Figure 6:
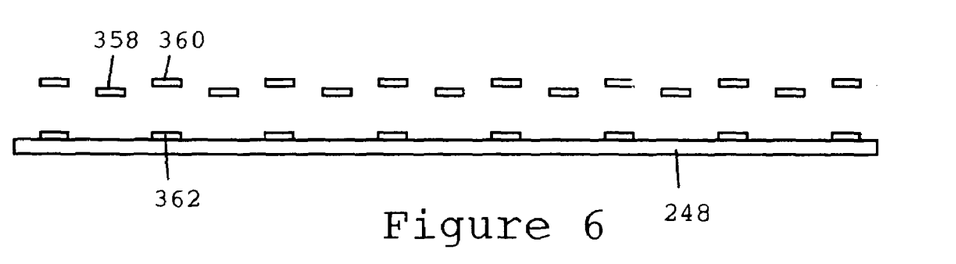
FIG. 6 is a schematic cross sectional view of an embodiment of the preferred mode of the reconfigurable diffraction grating wherein every other diffraction beam is deflectable beam with an associated lower electrode extension beam.

Thus far, the stationary beams 358, and the deflectable beams 360 have been shown alternating every position in the diffraction grating, which is represented in the cross sectional schematic view of FIG. 6. Alternative configurations of the stationary beams 358, and the deflectable beams 360, may be desired depending on desired wavelength range. Although the diffraction of the incoming light is altered by changing the vertical position of the deflectable beams 360, and thereby changing the vertical spacing between the stationary beams 358, and the deflectable beams 360, alternative configurations of the stationary beams 358 and the deflectable beams 360 are beneficial for various parts of the spectrum. In addition, such configurations can be determined based on the resolution requirements of the secondary grating structure that comprises the deflectable beams 360.

FIG. 7 illustrates an alternative configuration in which the deflectable beams 360 occupy every third position and the stationary beams 358 occupy the remaining positions. Similarly, FIG. 8 illustrates another alternative configuration in which the deflectable beams 360 occupy every fifth position and the stationary beams 358 occupy the remaining positions. The alternative configurations are not limited to those shown in FIGS. 6 though 8 respectively, a subset plurality of the diffraction beams, namely deflectable beams 360, can be separated from one another by exactly one, two and four diffraction beams of another subset plurality, namely stationary beams 358, of the diffraction beams, simply by virtue of the basic grating structure configuration.

FIG. 9, shows another alternative configuration of the reconfigurable compound diffraction grating 108 that could be beneficial to the design of the WDM/DWDM system, and which in fact is the most general. This employs a lower electrode extension beam 362 under every beam in the set of beams 256, thereby making every beam a deflectable beam 360, wherein some of the beams 256 are voltage deflected to a position appropriate to stationary beams 358, while others are voltage deflected to a position appropriate to deflectable beams 360, as earlier described. With this design, the voltage applied to the lower electrode leads 252 can be controlled to individually address each lower electrode extension 362 to actively reconfigure the diffraction grating to the appropriate configuration (every other, every third, every fifth, etc.) for the specified wavelength distribution to appropriate detectors of the WDM/DWDM. Here, a subset plurality of the diffraction beams can be separated from one another by exactly one, two, four, and indeed any number of diffraction beams of another subset plurality of the diffraction beams, by virtue of the voltage differentials applied.

Thus, in the embodiment of FIG. 9, each diffraction beam has one lower electrode extension beam associated therewith. This enables at least one subset plurality of the diffraction beams to be moved from the initial position thereof to the deflected position thereof in any desired periodic combination with respect to at least one other subset plurality of the diffraction beams (reconfigurable periodicity). It further enables the deflected positions of at least one subset plurality of the diffraction beams to differ from the deflected positions of at least one other subset plurality of the diffraction beams (reconfigurable compound structure).

In short, in its most general form, the embodiment of FIG. 9 uses voltage differential application means enabling the application of a plurality of voltage differentials to be applied to a corresponding plurality of subsets of the diffraction beams, wherein these subsets can be as small as a single beam, enabling full periodic and compound reconfigurability. (This "individual voltage addressability" of the beams is most suited to the FIG. 9 embodiment, but can also be utilized with other embodiments as well.) This advanced design is a natural extension of the configurations of the reconfigurable compound diffraction grating 108 presented herein and allows a single reconfigurable compound diffraction grating to satisfy all possible configuration requirements of the WDM/DWDM system.

Figure 10:
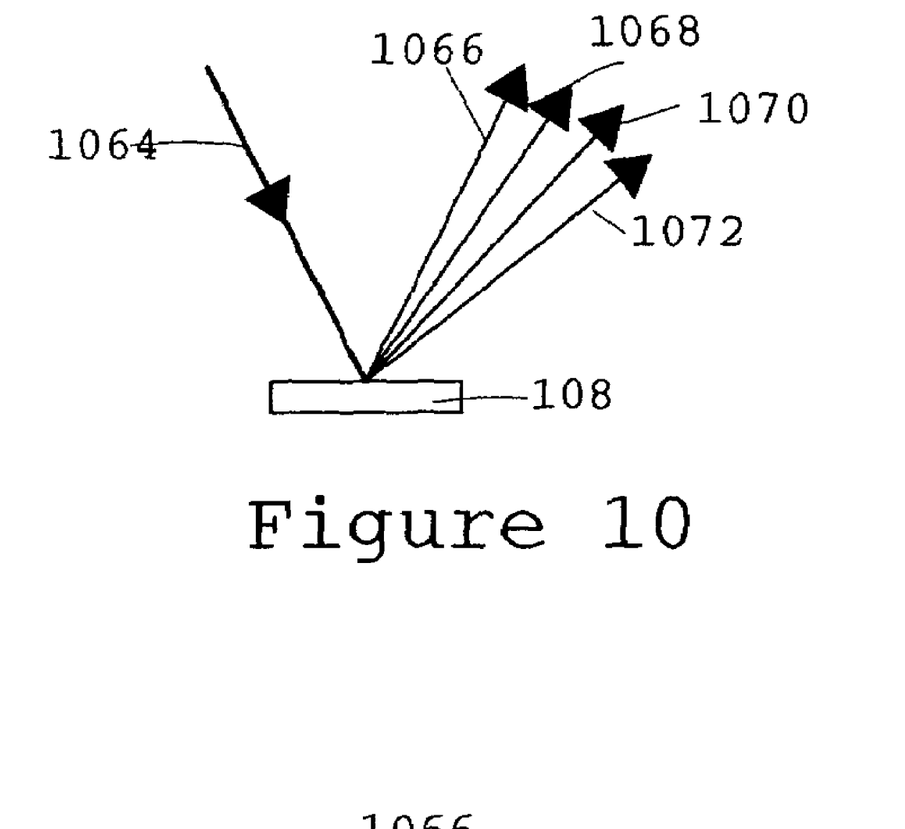
FIGS. 10 and 11 are representations of light diffracting from a suitable embodiment of the reconfigurable compound diffraction grating in its initial undeflected position (FIG. 10) and its secondary energized position (FIG. 11).
Figure 11:
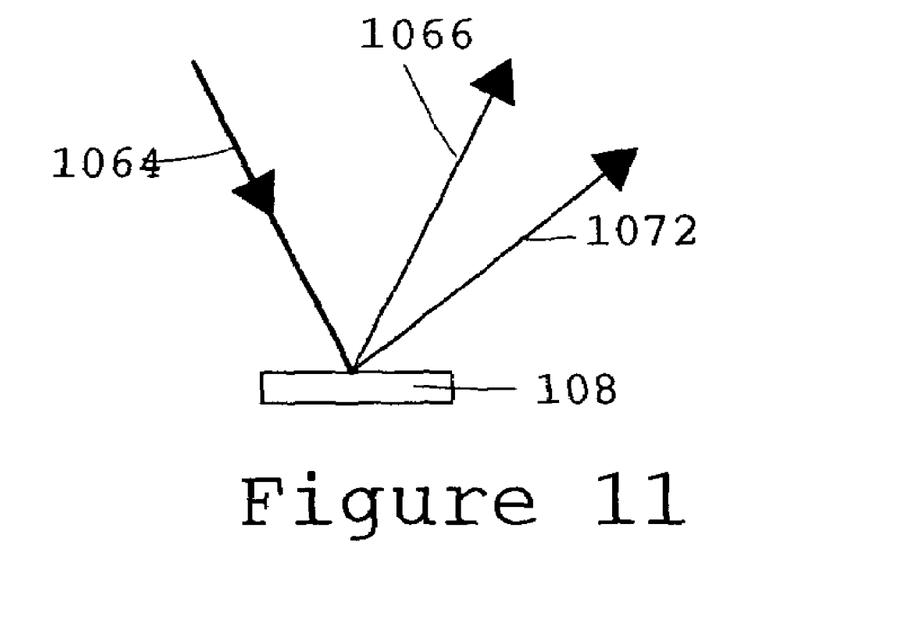

Using as an example the configuration in which every third beam is deflectable as in FIG. 7 (or in which the embodiment of FIG. 9 has voltages applied to it so as to configure an every-third-beam structure), FIGS. 10 and 11 are respective representations of the light diffracted from the reconfigurable compound diffraction grating 108 in the initial position (FIG. 10) and as the beams are deflected to the secondary position where the deflected and stationary beams are aligned (FIG. 11). That is, FIG. 10 represents the initial position of FIG. 4, and FIG. 11 represents the secondary position of FIG. 5, but with the every-third-beam spacing of FIG. 7. The diffraction is changed when the beams are deflected due to the change in the position of the reflective surface. The purpose of these representations is to demonstrate the reconfigurability and operation of the reconfigurable compound diffraction grating used to achieve the switching and wavelength or waveband selection described for the WDM/DWDM in FIG. 1, and not in any way to limit the disclosure or the associated claims.

FIG. 10 shows in detail, the light diffracted from the reconfigurable compound diffraction grating base 248 in the initial position of the configuration wherein every third beam is deflectable. The secondary diffraction grating comprising only the deflectable beams 360 causes the diffraction described below as due to 3 d spacing. The primary diffraction grating consisting of the entire set of beams 256, accounts for the diffraction described below as due to d spacing. The diffraction capable of being generated from impinging light 1064 (which corresponds to one of the input light beams discussed in connection with FIG. 1), includes a zero order, 1066, a first order (due to 3 d spacing where d is beam spacing), 1068, a second order (due to 3 d spacing), 1070 and a third order/first order superposition (due to 3 d spacing and d spacing, respectively), 1072. In this example, the first order 1068 represents and correspond to first orders 110, 112, 114, and 116 of FIG. 1. Similarly, second order 1070 represents and correspond to second orders 124, 126, 128, and 130. FIG. 11 shows the diffraction generated from the grating base 248 when the deflected beams (every third beam configuration) are moved to their secondary position where they are aligned with the undeflected beams. In this configuration impinging light 1064 is concentrated in only the zero order, 1066 and first order (due to d spacing), 1072. It is important to note that FIGS. 10 and 11 are simply illustrative of how light readings may be taken from this grating, and that many other variations obvious to someone of ordinary skill are possible and clearly within the scope of this disclosure and its associated claims.

The reconfigurable compound diffraction grating 108 is typically fabricated using MEMS processing. Current MEMS processing techniques are capable of features on the scale of 1–2 microns. The most critical dimension in the operation of the diffraction grating is the width of the beam. The ruling or grating spacing determines the resolution of the grating. With the current feature sizes on the 1–2 micron scale, a grating comparable with a medium resolution (600–1200 grooves/mm) conventional optical grating is produced. This resolution is ideal for the visible and near-infrared region of the electromagnetic spectrum and higher wavelengths, as well. The design of the reconfigurable compound diffraction grating can be scaled to include wider beams and grating spacings to be useful in applications in the infrared region of the electromagnetic spectrum. As the size limitations of the MEMS processing technique decreases, the reconfigurable compound diffraction grating will be applicable to even shorter wavelengths, and it is contemplated that the scaling of the beam width and ruling to such smaller dimensions is fully encompassed by this disclosure and its subsequent associated claims.

Alternative embodiments of the present invention of the WDM/DWDM system primarily utilize alternative configurations of reconfigurable diffraction grating 108. The design of the reconfigurable diffraction grating presented in FIGS. 2 through 9 constitutes the best mode possible at present. However, alternative configurations of the reconfigurable diffraction grating that can be implemented in the WDM/DWDM system include variations in the configuration of beams that establish the rulings of the diffraction grating. The design presented in the preferred embodiment of the WDM/DWDM system can be formed with a variety of beam widths and spacings between the beams, also known as grating spacing. For example, these variations include but are not limited to, beams spaced half a beam width apart, a quarter of a beam width apart, and twice a beam width apart. All such variations in the reconfigurable diffraction grating, and similar variations, are contemplated by this disclosure and its associated claims.

Further, while the reconfigurable compound diffraction grating 108 illustrated and discussed in detail in FIGS. 2 through 9 is the best mode for compound diffraction grating 108 that can be used in combination with the multiplexer of FIG. 1, the use of any other diffraction grating known in the art possessing suitable size and operational characteristics for use as element 108 in combination with the overall multiplexing system shown in FIG. 1 is also fully contemplated within the scope of this disclosure and its associated claims. This could include, for example, not limitation, any of the various diffractive elements referred to in the background of the invention herein, as well as the diffractive elements disclosed in the several U.S. Patent referred to herein, to the extent that their employment for this multiplexing application may be feasible and useful.

That is, this disclosure and its associated claims broadly encompass both a lightwave multiplexing system employing any suitable reconfigurable compound diffraction grating as element 108 in the manner and combination disclosed in FIG. 1, as well as, more narrowly, a lightwave multiplexing system employing the specific best mode of the reconfigurable compound diffraction grating disclosed in FIGS. 2 through 9 as element 108 in combination with the overall multiplexing/demultiplexing system disclosed in FIG. 1.

Another alternative configuration of the reconfigurable diffraction grating 108 that could be beneficial to the design of the WDM/DWDM system for a specific implementation includes coating the set of beams 256, the upper electrode lead 254, and the lower electrode lead 252, with a thin film of reflective coating such as gold or aluminum in order to significantly increase the reflectivity and therefore resultant signal strength. Coating the top surface of the set of beams 256, also provides a means of reducing the electrical resistance. This is particularly important in high frequency applications.

While only certain preferred features of the invention have been illustrated and described, many modifications, changes and substitutions will occur to those skilled in the art. It is, therefore, to be understood that this disclosure and its associated claims are intended to cover all such modifications and changes as fall within the true spirit of the invention.

I claim:

1. A combined optical wavelength division multiplexing and optical switching system, comprising:
a reconfigurable diffraction grating (108) diffracting at least one input light beam (106) into diffracted light beams of N wavebands (110, 112, 114, 116) wherein N is an integer greater than zero; and further diffracting each of said input light beams (106) into diffracted light beams (110, 112, 114, 116) across X diffraction orders wherein X is an integer greater than zero, for each of said N wavebands;
at least X sets of at least N light output means (140,144) each, each one of said X sets corresponding with one of said X diffraction orders, and for each said diffraction order, each one of said N light output means (120, 122) corresponding with one of said N wavebands at said order; wherein:
said N is greater than one;
said X is greater than one;
for each given one of said X diffraction orders, all of the diffracted light beams (110, 112, 114, 116) of a given one of said N wavebands, from all of said input light beams (106), are focused on the one of said N light output means (120, 122) corresponding with said given waveband within the one of said X sets of output means corresponding with said given one of said X diffraction orders;
diffraction beams (256) of said reconfigurable diffraction grating (108) are selectively movable relatively to one another; and
said reconfigurable diffraction grating (108) is reconfigurable to optically switch at least one specified waveband to a specified subset of said output means (120, 122) corresponding with a specified subset of said diffraction orders.

2. A combined optical wavelength division multiplexing and optical switching system, comprising:
a reconfigurable diffraction grating (108) diffracting at least one input light beam (106) into diffracted light beams of N wavebands (110, 112, 114, 116) wherein N is an integer greater than zero; and further diffracting each of said input light beams (106) into diffracted light beams (110, 112, 114, 116) across X diffraction orders wherein X is an integer greater than zero, for each of said N wavebands;
at least X optical detectors (142, 146), each one of said X optical detectors (142, 146) corresponding with and detecting diffracted light (110, 112, 114, 116) from one of said X diffraction orders, wherein:
said N is greater than one;
said X is greater than one;
for each given one of said X diffraction orders, all of the diffracted light beams (110, 112, 114, 116) at said given diffraction order, from all of said input light beams (106), are focused on the optical detector (142) corresponding with said given diffraction order;
for each given one of said X diffraction orders, all of the diffracted light beams (110, 112, 114, 116) of a given one of said N wavebands, from all of said input light beams (106), are focused on one of at least N light output regions (120, 122) of the optical detector (140) corresponding with said given diffraction order
diffraction beams (256) of said reconfigurable diffraction grating (108) are selectively movable relatively to one another; and
said reconfigurable diffraction grating (108) is reconfigurable to optically switch at least one specified waveband to a specified subset of said optical detectors (142, 146) corresponding with a specified subset of said diffraction orders.

3. The system of claim 1 or claim 2, said reconfigurable diffraction grating (108) comprising:
a first plurality of substantially parallel diffraction beams (256);
a second plurality of lower electrode extension beams (362) each associated with, substantially parallel to, and beneath one of said diffraction beams (256), said second plurality being at most equal to said first plurality in number; and voltage differential application means (252) for applying selected voltage differentials between each of said lower electrode extension beams (362) and its associated diffraction beam (256) to thereby move at least one diffraction beam (256) from an initial position thereof to a deflected position thereof.

4. The system of claim 3, said voltage differential application means enabling the application of a plurality of voltage differentials to be applied to a corresponding plurality of subsets of said diffraction beams (256), said subsets of said diffraction beams (256) comprising at least one of said diffraction beams (256).

5. The system of claim 1 or claim 2, further comprising a reflective coating on upper surfaces of a plurality of diffraction beams (256) of said reconfigurable diffraction grating (108) and on at least an upper surface of a base (248) of said reconfigurable diffraction grating (108).

6. The system of claim 1 or claim 2, wherein said reconfigurable diffraction grating (108) is fabricated using microelectromechanical systems technology.

7. The system of claim 1 or claim 2, wherein a ratio of spacing between each successive diffraction beam of a plurality of diffraction beams (256) of said reconfigurable diffraction grating (108) to a width of each said diffraction beam (256) is substantially between ¼ to 1 and 2 to 1.

8. The system of claim 1 or claim 2, further comprising:
optical input means (100) for delivering an input source light beam (102) to said system; and
means of collimating (104) said input source light beam (102) into said at least one input light beam (106) diffracted by said reconfigurable diffraction grating (108).

9. The system of claim 1, each of said at least N output means (120, 122) of each said set of output means (140) comprising an individual optical fiber.

10. The system of claim 1, each of said at least X sets of at least N light output means (140) comprising an optical fiber bundle of at least N optical fibers.

11. The system of claim 1, further comprising:
at least X optical detectors (140, 146), each one of said X optical detectors (140, 146) corresponding with and detecting diffracted light (110, 112, 114, 116) from one of said X diffraction orders, and also corresponding with and receiving diffracted light from the set of at least N light output means (140) corresponding with said one of said X diffraction orders, wherein:
for each given one of said X diffraction orders, all of the diffracted light beams (110, 112, 114, 116) at said given diffraction order, from all of said input light beams (106), are received by the optical detector (142) corresponding with said given diffraction order over said set of at least N light output means (120, 122) corresponding with said given diffraction order; and
for each given one of said X diffraction orders, all of the diffracted light beams (110, 112, 114, 116) of a given one of said N wavebands, from all of said input light beams (106), are received by one of at least N light output regions (120, 122) of the optical detector (142) detecting said given diffraction order over the one of said N light output means (120, 122) corresponding with said given one of said N wavebands at said order.

12. The system of claim 1 or claim 2, said at least one input light beam comprising more than one input light beam.

13. A method of optical wavelength division multiplexing in combination with optical switching, comprising the steps of:
diffracting at least one input light beam (106) into diffracted light beams (110, 112, 114, 116) of N wavebands wherein N is an integer greater than zero, by selectively moving diffraction beams (256) of a reconfigurable diffraction grating (108) relatively to one another;
further diffracting each of said input light beams (110, 112, 114, 116) into diffracted light beams across X diffraction orders wherein X is an integer greater than zero, for each of said N wavebands, also using said reconfigurable diffraction grating (108);
providing at least X sets of at least N light output means (140) each, each one of said X sets corresponding with one of said X diffraction orders, and for each said diffraction order, each one of said N light output means (140) corresponding with one of said N wavebands at said order;
for each given one of said X diffraction orders, focusing all of the diffracted light beams (110, 112, 114, 116) of a given one of said N wavebands, from all of said input light beams (106), on the one of said N light output means (140) corresponding with said given waveband within the one of said X sets of output means (140) corresponding with said given one of said X diffraction orders; and
optically switching at least one specified waveband to a specified subset of said output means (120, 122) corresponding with a specified subset of said diffraction orders by reconfiguring said reconfigurable diffraction grating (108); wherein:
said N is greater than one; and
said X is greater than one.

14. A method of optical wavelength division multiplexing in combination with optical switching, comprising the steps of:
diffracting at least one input light beam (106) into diffracted light beams (110, 112, 114, 116) of N wavebands wherein N is an integer greater than zero, by selectively moving diffraction beams (256) of a reconfigurable diffraction grating (108) relatively to one another;
further diffracting each of said input light beams (110, 112, 114, 116) into diffracted light beams across X diffraction orders wherein X is an integer greater than zero, for each of said N wavebands, also using said reconfigurable diffraction grating (108);
providing at least X optical detectors (142, 146), each one of said X optical detectors (142, 146) corresponding with and detecting diffracted light (110, 112, 114, 116) from one of said X diffraction orders;
for each given one of said X diffraction orders, focusing all of the diffracted light beams (110, 112, 114, 116) at said given diffraction order, from all of said input light beams (106), on the optical detector (142) corresponding with said given diffraction order;
for each given one of said X diffraction orders, focusing all of the diffracted light beams (110, 112, 114, 116) of a given one of said N wavebands, from all of said input light beams (106), on one of at least N light output regions (120, 122) of the optical detector (142) corresponding with said given diffraction order; and
optically switching at least one specified waveband to a specified subset of said optical detectors (142, 146) corresponding with a specified subset of said diffraction orders by reconfiguring said reconfigurable diffraction grating (108); wherein:
said N is greater than one; and
said X is greater than one.

15. The method of claim 13 or claim 14, comprising the further steps of:
providing a first plurality of substantially parallel diffraction beams (256) of said reconfigurable diffraction grating (108);
providing a second plurality of lower electrode extension beams (362) of said reconfigurable diffraction grating (108), each associated with, substantially parallel to, and beneath one of said diffraction beams (256), said second plurality being at most equal to said first plurality in number; and
moving at least one said diffraction beam (256) from an initial position thereof to a deflected position thereof by applying selected voltage differentials between said diffraction beams (256) and their associated lower electrode extension beams (362), using voltage differential application means (252).

16. The method of claim 15, comprising the further step of applying a plurality of voltage differentials to a corresponding plurality of subsets of said diffraction beams (256), said subsets of said diffraction beams (256) comprising at least one of said diffraction beams (256), using said voltage differential application means (252).

17. The method of claim 13 or claim 14, comprising the further step of:
    providing a reflective coating on upper surfaces of a plurality of diffraction beams (256) of said reconfigurable diffraction grating (256) and on at least an upper surface of a base (248) of said reconfigurable diffraction grating (108).

18. The method of claim 13 or claim 14, comprising the further step of:
    fabricating said reconfigurable diffraction grating using microelectromechanical systems technology.

19. The method of claim 13 or claim 14, wherein a ratio of spacing between each successive diffraction beam of a plurality of diffraction beams (256) of said reconfigurable diffraction grating (108) to a width of each said diffraction beam (256) is substantially between ¼ to 1 and 2 to 1.

20. The method of claim 13 or claim 14, further comprising:
    delivering an input source light beam (102) for multiplexing by said method, using optical input means (100); and
    collimating said input source light beam (102) into said at least one input light beam for diffracting (106) by said reconfigurable diffraction grating (108).

21. The method of claim 13, each of said at least N output means (120, 122) of each said each said set of output means (140) comprising an individual optical fiber.

22. The method of claim 13, each of said at least X sets of at least N light output means (140) comprising an optical fiber bundle of at least N optical fibers.

23. The method of claim 13, comprising the further steps of:
    providing at least X optical detectors (142, 146), each one of said X optical detectors (142, 146) corresponding with and detecting diffracted light (110, 112, 114, 116) from one of said X diffraction orders, and also corresponding with and receiving diffracted light (110, 112, 114, 116) from the set of at least N light output means (140) corresponding with said one of said X diffraction orders;
    for each given one of said X diffraction orders, receiving all of the diffracted light beams (110, 112, 114, 116) at said given diffraction order, from all of said input light beams (106), with the optical detector (142) corresponding with said given diffraction order, over said set of at least N light output means (140) corresponding with said given diffraction order; and
    for each given one of said X diffraction orders, receiving all of the diffracted light beams (110, 112, 114, 116) of a given one of said N wavebands, from all of said input light beams (106), at one of at least N light output regions (120, 122) of the optical detector (142) detecting said given diffraction order, over the one of said N light output means (140) corresponding with said given one of said N wavebands at said order.

24. The method of claim 13 or claim 14, said at least one input light beam comprising more than one input light beam.

* * * * *